US010838214B2

(12) United States Patent
Chen et al.

(10) Patent No.: US 10,838,214 B2
(45) Date of Patent: Nov. 17, 2020

(54) ANGLE COMPENSATING LENS AND DISPLAY

(71) Applicant: Facebook Technologies, LLC, Menlo Park, CA (US)

(72) Inventors: Dong Chen, Foster City, CA (US); Fenglin Peng, Redmond, WA (US); Shizhe Shen, Foster City, CA (US); Babak Amirsolaimani, Redmond, WA (US); Yusufu Njoni Bamaxam Sulai, Bothell, WA (US); Lu Lu, Kirkland, WA (US); Junren Wang, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/220,806

(22) Filed: Dec. 14, 2018

(65) Prior Publication Data
US 2020/0192096 A1 Jun. 18, 2020

(51) Int. Cl.
*G02B 27/01* (2006.01)
*G02B 27/28* (2006.01)
*G02F 1/1335* (2006.01)
*G02B 27/09* (2006.01)

(52) U.S. Cl.
CPC ..... *G02B 27/0172* (2013.01); *G02B 27/0955* (2013.01); *G02B 27/286* (2013.01); *G02F 1/133528* (2013.01)

(58) Field of Classification Search
CPC ............ G02B 27/0176; G02B 27/0172; G02B 2027/0152; G02B 2027/015; G02B 2027/0178; G02B 2027/014; G02B 27/286; G02B 27/0955; H02J 7/0044; H02J 7/0013; H02J 7/025; G09G 5/006; G09G 2370/16; H04B 1/385; G02F 1/133528

See application file for complete search history.

(56) References Cited

U.S. PATENT DOCUMENTS

| 5,742,262 | A * | 4/1998 | Tabata | G02B 27/0081 345/8 |
| 9,442,292 | B1 * | 9/2016 | Gao | G02B 27/0093 |
| 9,606,355 | B2 * | 3/2017 | Larson | B64D 43/02 |
| 10,386,638 | B2 * | 8/2019 | Kim | G02B 27/1066 |
| 10,422,976 | B2 * | 9/2019 | Stamenov | G02B 27/0025 |
| 10,469,833 | B2 * | 11/2019 | Hua | H04N 13/344 |
| 10,527,854 | B1 * | 1/2020 | Trail | G02B 27/0081 |

(Continued)

OTHER PUBLICATIONS

Non-Final Office Action, U.S. Appl. No. 16/171,614, Notification dated Feb. 12, 2020, 14 Pages.

(Continued)

*Primary Examiner* — Grant Sitta
(74) *Attorney, Agent, or Firm* — Freestone Intellectual Property Law PLLC; Aaron J. Visbeek

(57) ABSTRACT

A display includes a display pixel array and a light bending assembly. The display pixel array is configured to generate display light. The light bending assembly is disposed over the display pixel array to receive the display light and generate compensated display light. The light bending assembly bends a given ray of the display light based on an incidence position that the given ray of the display light becomes incident upon the light bending assembly.

19 Claims, 16 Drawing Sheets

(56) References Cited

U.S. PATENT DOCUMENTS

| | | | |
|---|---|---|---|
| 10,552,676 B2* | 2/2020 | Shroff | G06F 3/011 |
| 10,594,951 B2* | 3/2020 | Lamkin | G06T 7/557 |
| 10,607,524 B2* | 3/2020 | Jia | H01L 27/3234 |
| 10,620,360 B2* | 4/2020 | Parikka | G02B 6/0036 |
| 10,684,531 B1* | 6/2020 | Ziemkiewicz | G02B 26/108 |
| 10,690,910 B2* | 6/2020 | Lamkin | G02C 7/083 |
| 2007/0035707 A1 | 2/2007 | Margulis | |
| 2008/0297894 A1 | 12/2008 | Kim et al. | |
| 2009/0295744 A1 | 12/2009 | Onishi | |
| 2010/0091027 A1 | 4/2010 | Oyama et al. | |
| 2015/0116354 A1 | 4/2015 | Tomlin et al. | |
| 2015/0205132 A1 | 7/2015 | Osterhout et al. | |
| 2016/0239985 A1* | 8/2016 | Haddick | G06T 11/001 |
| 2017/0039904 A1* | 2/2017 | Jepsen | G02B 27/0093 |
| 2017/0139211 A1 | 5/2017 | Trail | |
| 2018/0067322 A1 | 3/2018 | Alexander et al. | |
| 2018/0101230 A1 | 4/2018 | Vidal et al. | |
| 2018/0114298 A1* | 4/2018 | Malaika | G02B 27/017 |
| 2018/0321426 A1* | 11/2018 | Weinstock | G02B 27/0172 |
| 2019/0101759 A1 | 4/2019 | Usukura et al. | |

OTHER PUBLICATIONS

Non-Final Office Action, U.S. Appl. No. 16/253,587, Notification dated Feb. 19, 2020, 16 pages.

* cited by examiner

ANGLE COMPENSATING LENS AND DISPLAY

TECHNICAL FIELD

This disclosure relates generally to optics, and in particular to displays.

BACKGROUND INFORMATION

Head mounted displays (HMDs) may include a display for presenting images to a user of the HMD. The quality of the presented images may enhance the user experience and contribute to the feeling of "presence" that a user experiences when engaged in virtual reality, for example. Historically, the displays used in HMDs have leveraged the small displays designed for use in mobile electronics such as smartphones. However, the design goals of displays may differ from mobile electronics targets in contexts where the display may be viewed through a lens, for example.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
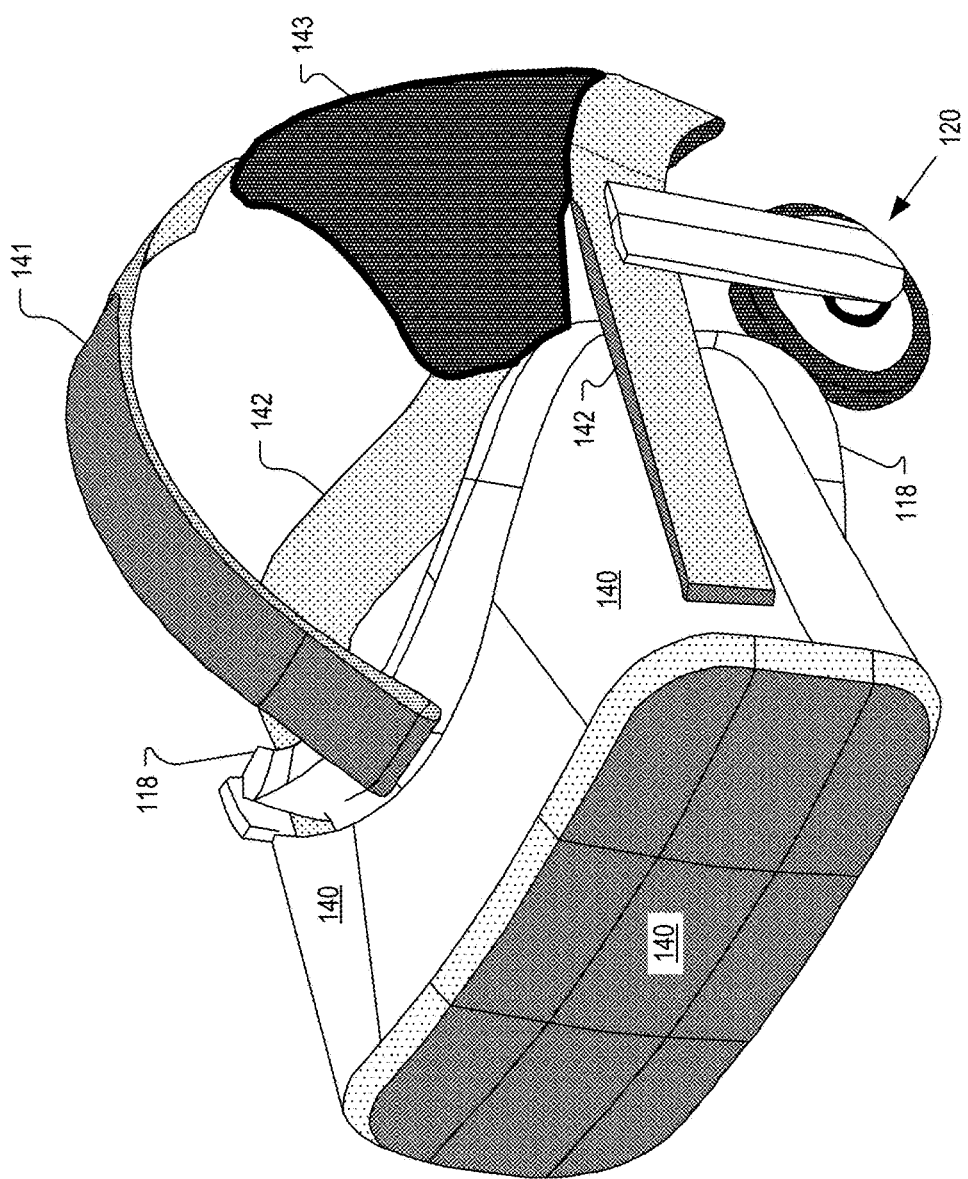
FIG. 1 illustrates an example head mounted display (HMD) that may include one or more angle compensated displays, in accordance with an embodiment of the disclosure.

Embodiments of an angle compensated lens and display and a head mounted display (HMD) including an angle compensated display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The angle compensated display, the light bending assembly, and the HMD described in this disclosure may provide substantially uniform brightness image light to a user of the HMD. When an HMD includes a lens for focusing display light for a user, the display light received at the center of the lens is typically approximately orthogonal to a two-dimensional pixel plane of the display while display light received at the edge of the lens is typically angled display light. Consequently, the display light received from the edge of the display has a lower brightness value than display light received from the center of the display. For example, display light received at the center of the lens may be approximately 15-25% brighter than angled display light received at the edge of the lens. This display light brightness difference may result in images presented to the user that get dimmer and dimmer toward the outside of the image and therefore negatively impact the quality of the viewing experience.

In embodiments of the disclosure, a light bending assembly disposed over a display generates compensated display light by progressively increasing a bending angle of the display light as an incidence position of the display light as the display light gets farther from a center of the light bending assembly. A center of the light bending assembly and a center of the display may be axially aligned upon a central optical axis of a focusing lens in an HMD. By progressively increasing the bending angle of the display light, the compensated display light received by a focusing lens may have a substantially same brightness value so that an image presented to the user has substantially uniform brightness. In one embodiment, the light bending assembly includes a plurality of liquid crystal cells that have a varied pitch. A pitch of the liquid crystal cells may decrease as the liquid crystal cells get farther from a center of a light bending lens that includes the liquid crystal cells. These and other embodiments are described in with respect to FIGS. 1-9 below.

FIG. 1 illustrates an example head mounted display (HMD) 100 that may include one or more angle compensated displays, in accordance with an embodiment of the disclosure. Example head mounted display (HMD) 100 includes a top structure 141, a rear securing structure 143, and a side structure 142 attached with a viewing structure 140 having a front rigid body 144. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include an angle compensated display for directing image light to a wearer of HMD 100. The display may include a Liquid Crystal Display (LCD) having a two-dimensional display pixel array of liquid crystal pixels arranged in rows and columns, for example. The display may include an organic light emitting diode (OLED) display, micro-LED display, quantum dot display, pico-projector, or liquid crystal on silicon (LCOS) display for directing image light to a wearer of HMD 100.

Figure 2A:
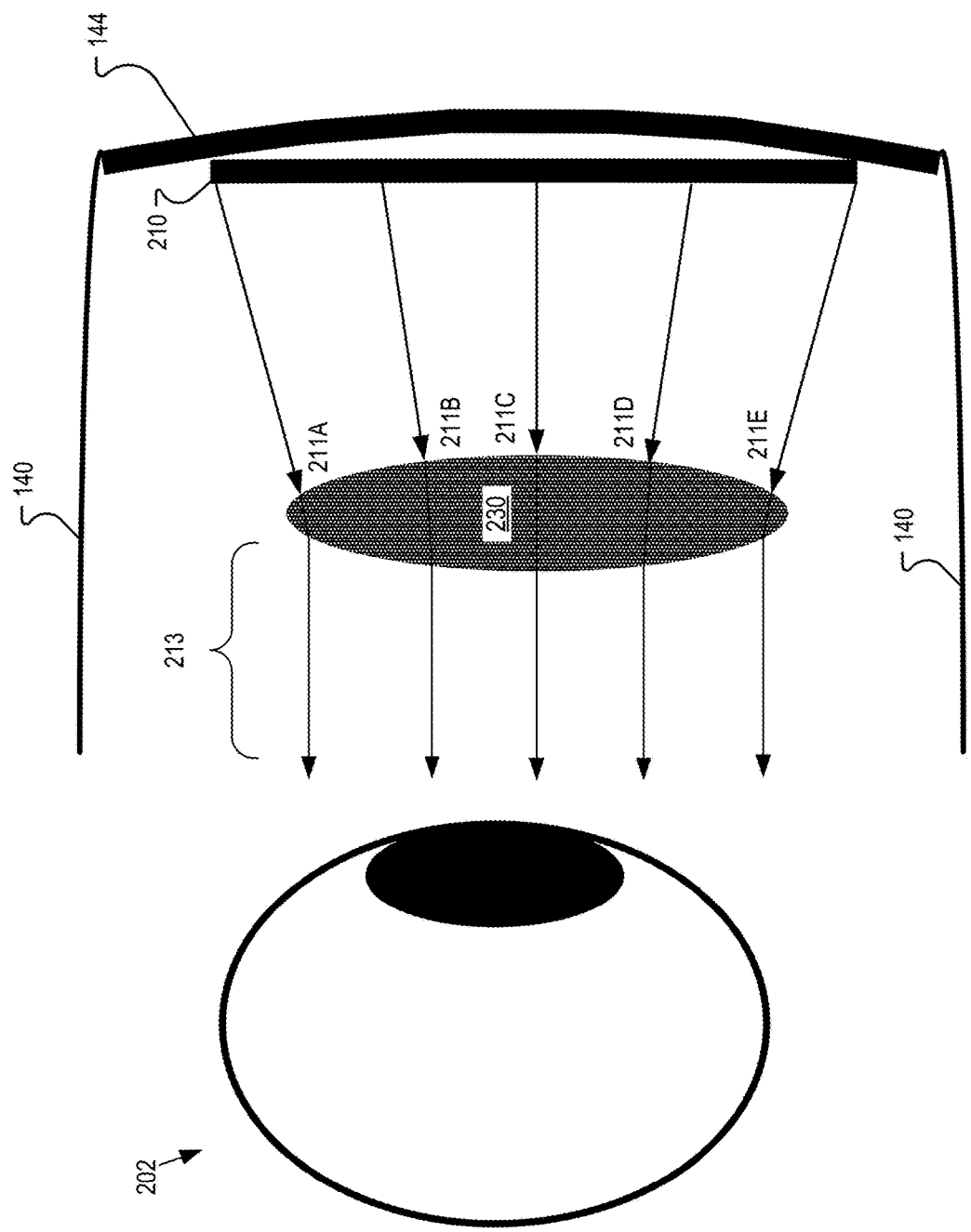
FIGS. 2A-2C illustrate an HMD that includes a display and related brightness profiles.

FIG. 2A illustrates a cut away view of HMD 100 that includes a display 210 and a lens assembly 230 configured to direct display light 211 to an eyebox area. Display 210 may be shaped as a rectangle or square, in some embodiments. Display 210 may include a Liquid Crystal Display (LCD) having a two-dimensional display pixel array of liquid crystal pixels arranged in rows and columns, for example. Display 210 may include an organic light emitting diode (OLED) display, micro-LED display, or a quantum dot display. Lens assembly 230 is positioned to receive the display light 211 and direct the display light 211 to eye 202 as image light 213. Lens assembly 230 may be configured to allow eye 202 of a wearer of HMD 100 to focus on a virtual image displayed by display 210. In one embodiment, lens assembly 230 is a double-meniscus lens formed of a refractive material such as glass or plastic. Although FIG. 2A only illustrates one eye 202, an HMD may have a display 210 (or a portion of a shared display) and a lens assembly 230 for each eye of the user of the HMD.

Figure 2C:
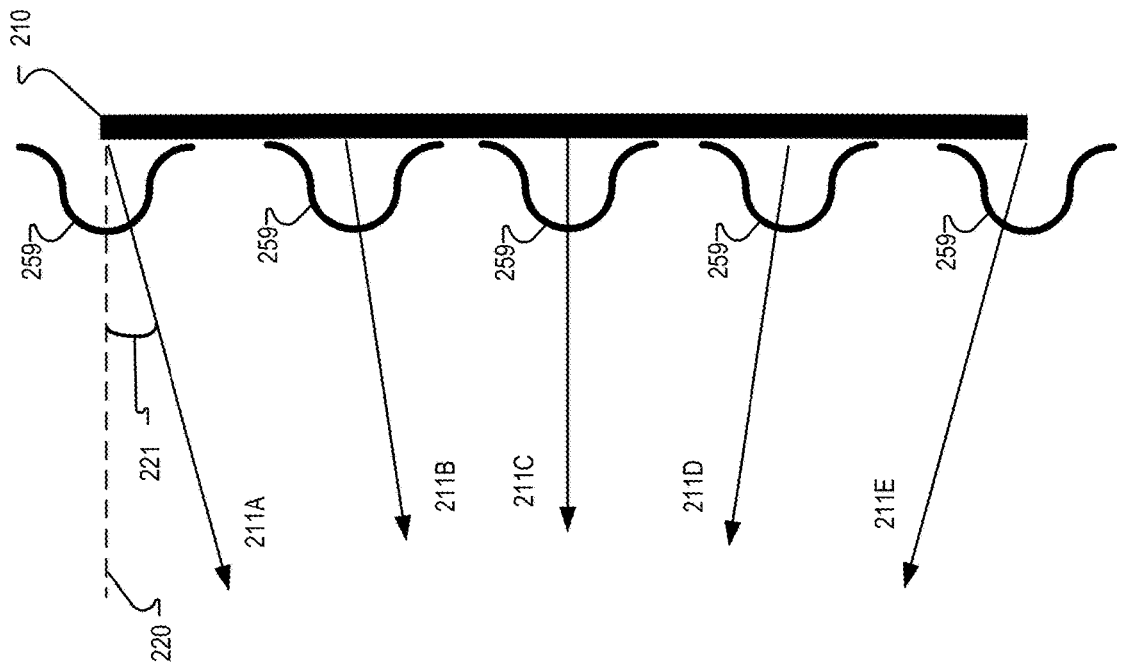
Figure 2B:
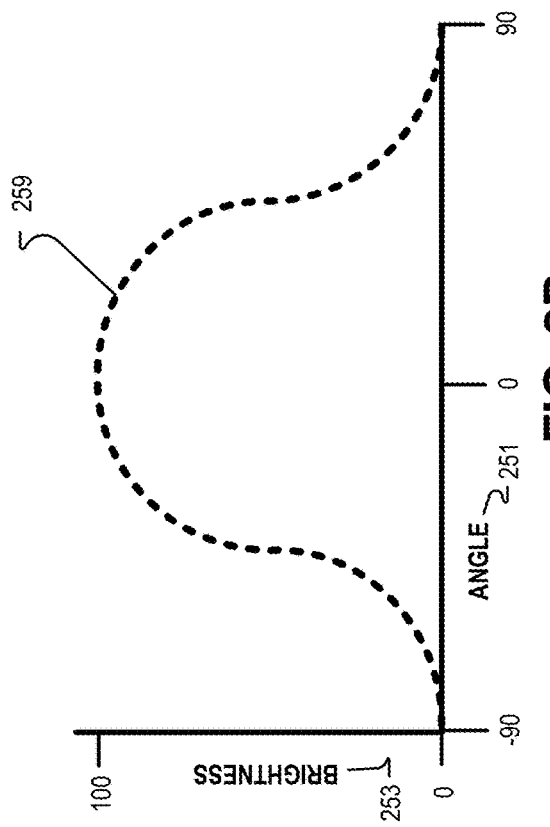

FIG. 2B illustrates an example brightness profile 259 for display pixels of a display. In FIG. 2B, a brightness value of brightness profile 259 is at its highest (e.g. brightness value of 100) when a viewing angle 251 of the display pixel is at zero. In other words, a given display pixel emits a highest brightness value of display light along an emission axis that is approximately orthogonal to a two-dimensional pixel plane of the display pixel array. When the same display pixel is viewed at a viewing angle approaching 90 or −90, the brightness value is at its lowest (approaching zero). Those skilled in the art appreciate that brightness profile 259 is merely an example and understand that brightness profiles vary by display pixel technologies and may be dependent on additional factors such as the filter stack disposed over a given display pixel array.

FIG. 2C illustrates example brightness profile 259 overlaying various rays of display light 211. In FIG. 2C, display light ray 211C is emitted from a center of display 210 and has a baseline brightness value or a brightness value that approaches a baseline brightness value. Lens 230 may be disposed to receive display light ray 211C in a center of the lens that corresponds with a central optical axis of the lens 230. Display light rays 211A and 211E have a brightness value that is significantly less (e.g. 15-25% less) than a baseline brightness value since lens 230 may receive rays 211A and 211E at slight angles from the orthogonal axis 220 of the display pixel that emits rays 211A and 211E. FIG. 2C illustrates an example orthogonal axis 220 that is orthogonal to a pixel plane of the display pixel array of display 210. Notably, display light ray 211A is offset from orthogonal axis 220 by angle 221, and consequently, the brightness value of ray 211A that reaches lens 230 is significantly less than a baseline brightness value (e.g. brightness value of 100) of ray 211C. While the display pixel that emits ray 211A may also emit display light along orthogonal axis 220 that has the baseline brightness value of ray 211C, that ray of display light emitted along orthogonal axis 220 is not received by lens 230 and thus is not focused for the eye 202 of a user of the HMD. Display light ray 211E is emitted at a similar angle 221 and thus a similar brightness value as display light ray 211A.

Display light rays 211B and 211D may have a brightness value that is between the baseline brightness value of ray 211C and the brightness value of rays 211A or 211E since rays 211B and 211D are emitted at angles that are less than angle 221. Given that the brightness value of emitted display light generally decreases as the offset angle 221 increases, the display light 211 that is focused by lens 230 may decrease in brightness as a position of a given display pixel increases in distance from the center of display 210. This may result in image light 213 (illustrated in FIG. 2A) being presented to eye 202 being progressively dimmer as the distance from a center of the image increases.

Figure 3:
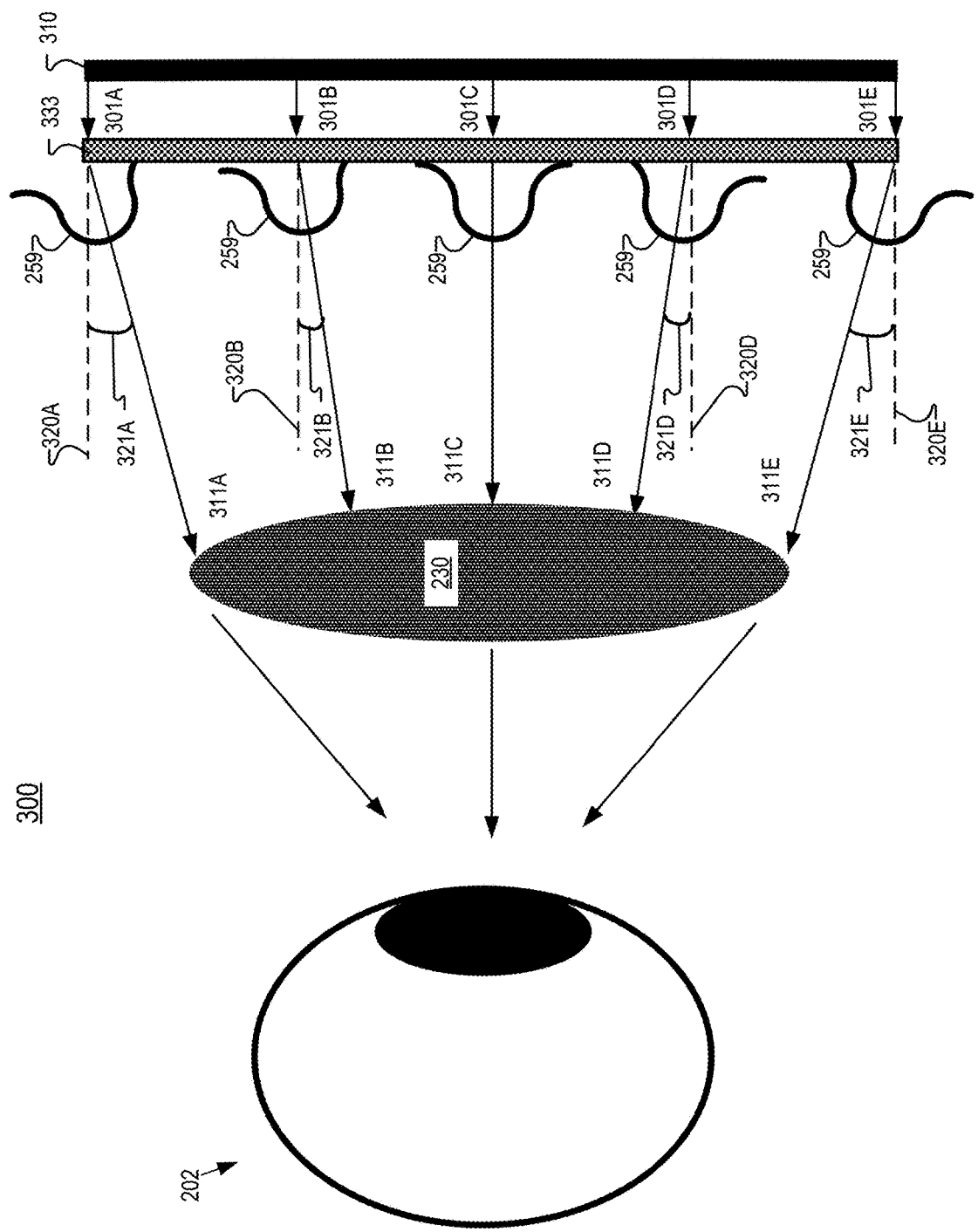
FIG. 3 illustrates a system including a display and a light bending assembly, in accordance with an embodiment of the disclosure.

FIG. 3 illustrates a system 300 including a display 310 and a light bending assembly 333, in accordance with embodiments of the disclosure. System 300 also includes a focusing lens 230. FIG. 3 may be either a side view or a top view of system 300. Display 310 includes a display pixel array configured to generate display light 301 that may include images for presentation to eye 202. Light bending assembly 333 may be coupled to display 310 in some embodiments, although it is offset in FIG. 3 for illustrative purposes. The utilization of light bending assembly 333 with display 310 forms an angle compensated display. Light bending assembly 333 is configured to receive display light 301 and generate compensated display light 311 represented by compensated display light rays 311A, 311B, 311C, 311D, and 311E.

In operation, display 310 emits display light 310 that includes display light rays 301A, 301B, 301C, 301D, and 301E. Display light ray 301C may be emitted from a center of display 310 while display light rays 310A and 310E may be emitted from edges of display 310. Display light ray 301C may be emitted from a center of a two-dimensional display pixel array of display 310 and propagate through a center of light bending assembly 333 and further propagate along a central optical axis of focusing lens 230 (through a center of focusing lens 230) prior to becoming incident on eye 202. The central optical axis of focusing lens 230 may be aligned with a center of the display pixel array and a center of the light bending assembly 333 in this embodiment.

Light bending assembly 333 bends a given ray of the display light 301 based on an incidence position that the given ray of the display light 301 becomes incident upon the light bending assembly 333. For example, light bending assembly 333 imparts a bending angle 321A to display light ray 301A to generate a compensated display light ray 311A. Imparting a bending angle 321A to ray 301A to generate ray 311A may align ray 311A with its chief ray angle with respect to the system 300 that includes focusing lens 230. Each of rays 311B, 311C, 311D, and 311E may also be aligned with their respective chief ray angle with respect to system 300. Bending angle 321A is measured with respect to an orthogonal axis 320A that is orthogonal to a display pixel in the display pixel array of display 310. In FIG. 3, brightness profile 259 overlaying ray 311A is illustrated as tilted to account for the bending characteristics of light bending assembly 333 and ray 311A runs through a highest brightness value to indicate that ray 311A has the baseline brightness value (e.g. brightness value of 100) of brightness profile 259 as a result of the bending angle 321A being imparted by light bending assembly 333.

In FIG. 3, the bending angles 321 imparted by light bending assembly 333 increases as the incidence position of a given ray of display light 301 gets farther from a center of the light bending assembly 333 and compensated rays (e.g. 311A, 311B, 311C, 311D, and 311E) of the compensated display light 311 may have a substantially same brightness value. Bending angle 321A is greater than bending angle 321B because the incidence position of ray 301A is farther from a center of light bending assembly 333 than the incidence position of ray 301B, in the illustrated embodiment. Similarly, bending angle 321E is greater than bending angle 321D because the incidence position of ray 301E is farther from a center of light bending assembly 333 than the incidence position of ray 301D. Bending angle 321B is measured with respect to an orthogonal axis 320B of the display pixel that emits ray 301B, bending angle 321D is measured with respect to an orthogonal axis 320D of the display pixel that emits ray 301D, and bending angle 321E is measured with respect to an orthogonal axis 320E of the display pixel that emits ray 301E.

Brightness profiles 259 in FIG. 3 have been tilted to account for the bending characteristics of light bending assembly 333 to preserve the baseline brightness value of rays 301 and redirect that high baseline brightness value ray along a chief ray angle with respect to system 300 and focusing lens 230. Consequently, the brightness value of ray 311A may be the same or similar as ray 301A, the brightness value of ray 311B may be the same or similar as ray 301B, the brightness value of ray 311C may be the same or similar as ray 301C, the brightness value of ray 311D may be the same or similar as ray 301D, and the brightness value of ray 311E may be the same or similar as ray 301E. Therefore, the brightness values of rays 311A, 311B, 311C, 311D, and 311E may be substantially the same so that the brightness of an image presented to eye 202 by system 300 is substantially uniform. In contrast, the example rays 211A, 211B, 211C, 211D, and 211E of FIG. 2A get dimmer as a given ray gets farther from a center of display 210.

Figure 4:
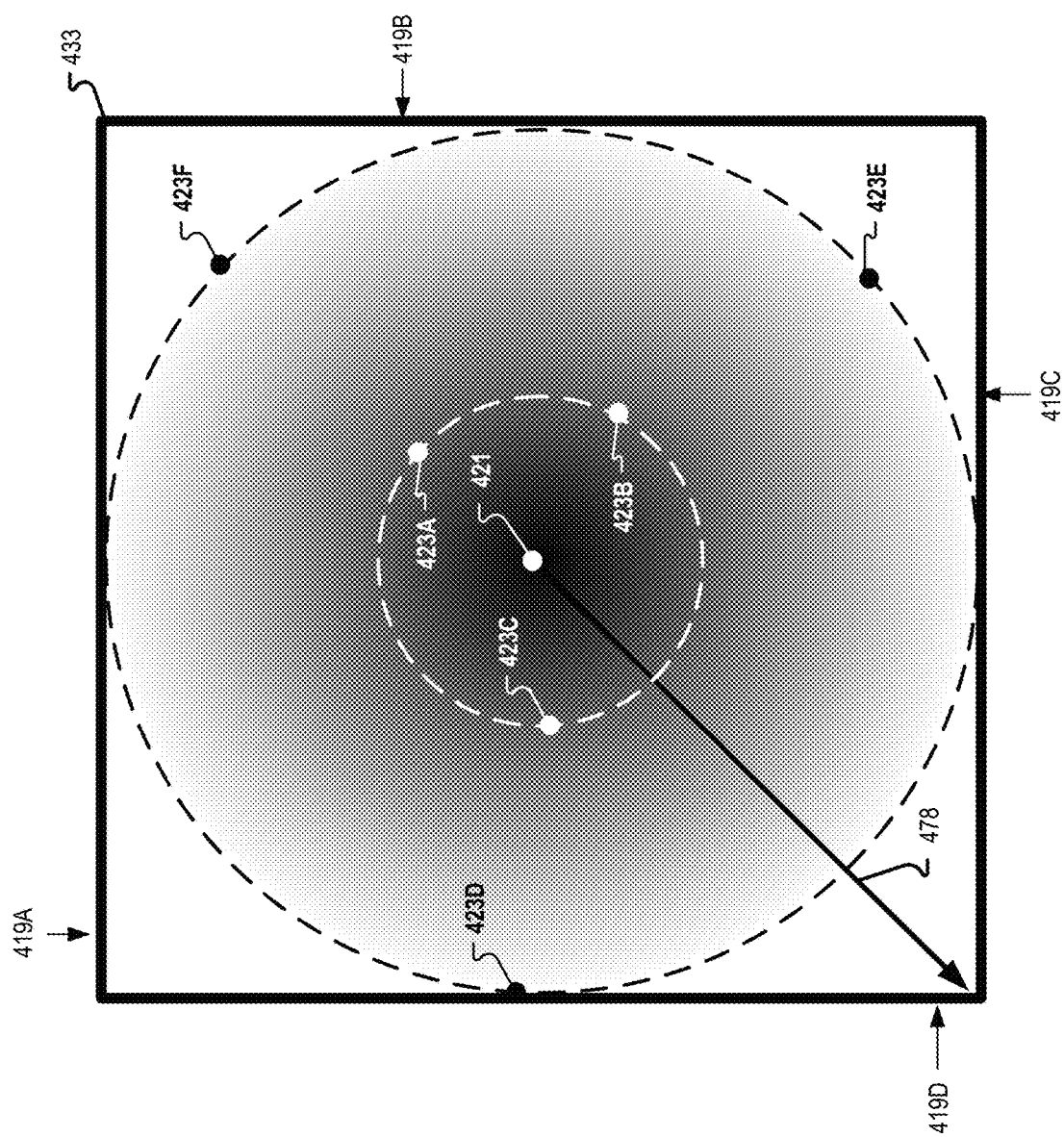
FIG. 4 illustrates a front view of an example light bending assembly shaped as a square, in accordance with an embodiment of the disclosure.

FIG. 4 illustrates a front view of an example light bending assembly 433 shaped as a square, in accordance with embodiment of the disclosure. In some embodiment, light bending assembly 433 may be shaped as a rectangle, a hexagon, or octagon, for example. Light bending assembly 333 may be configured to the characteristics of light bending assembly 433, in some embodiments. Light bending assembly 433 may be placed over a display that has a two-dimensional pixel array shaped as a square. Light bending assembly 433 may be coupled on a parallel plane to a pixel plane defined by the two-dimensional display pixel array that may be defined by a height of rows of display pixels and a width of columns of display pixels. Light bending assembly 433 includes edges 419A, 419B, 419C, and 419D along with a center 421. FIG. 4 shows example incidence positions 423A, 423B, 423C, 423D, 423E, and 423F. Example light bending assembly 433 includes a gradient arrow 478 where the farther the incidence position is from the center 421, the greater the bending angle imparted by the light bending assembly 433 will be. The gradient of gradient arrow 478 is also indicated by the darker shading near center 421 becoming progressively lighter as a distance from center 421 increases to represent a bending angle becoming progressively greater as the distance from center 421 increases. Hence, the bending angle imparted to a ray of display light 301 incident at incidence position 423D will be greater than a bending angle imparted to a ray of display light 301 incident at incidence position 423C.

FIG. 4 shows that rays of display light 301 incident at incidence positions 423A, 423B, and 423C are all equal distance from center 421 (along a same radius that defines the illustrated white dashed-line circle). Therefore, the bending angle imparted to a given ray of display light 301 incidence at incidence positions 423A, 423B, and 423C may have a same bending angle. Similarly, rays of display light 301 incident at incidence positions 423D, 423E, and 423F are also equal distance from center 421 and may have a same bending angle. Of course, the bending angle imparted by light bending assembly 433 will be greater at incidence position 423D than the bending angle imparted at incidence position 423A. In one embodiment, light bending assembly 433 imparts a bending angle 321B to rays of display light 301 incident at incident positions 423A-C and imparts a bending angle 321A to rays of display light 301 incident at incident positions 423D-F. Light bending assembly 433 may impart a bending angle of approximately 0 degrees to display light received at the center 421 of light bending assembly 433 and impart a bending angle of between 15 and 25 degrees at an edge 419 of the light bending assembly 433. The bending angle at the edge may be dependent on the spacing of focusing lens 230 from an angle compensated display that includes a light bending assembly 333.

Figure 5A:
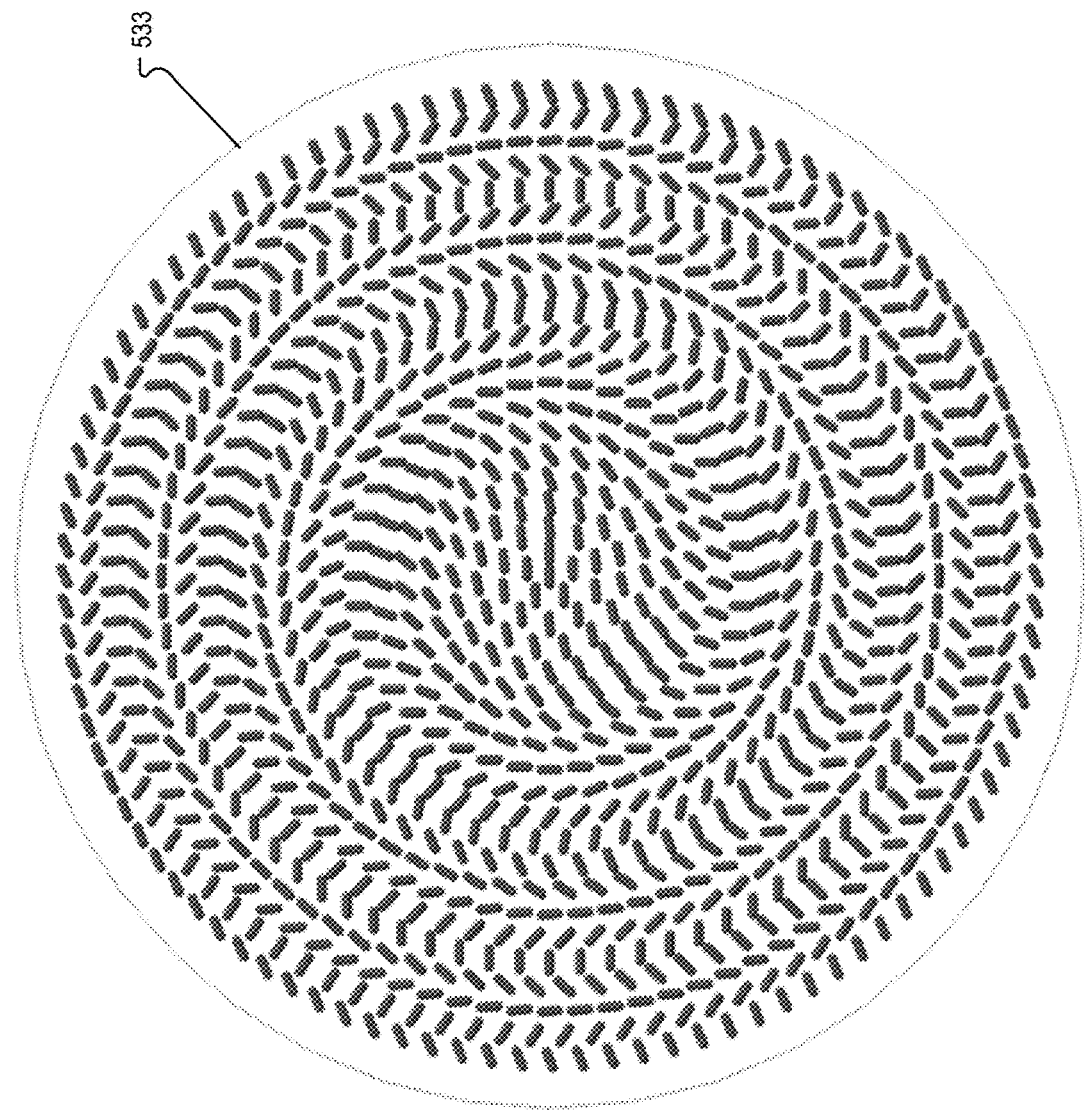
FIGS. 5A-5F illustrate example light bending lenses with associated example characteristic graphs, in accordance with an embodiment of the disclosure.

FIG. 5A illustrates a front view of an example light bending lens 533 that may be included in a light bending assembly such as light bending assembly 333, in accordance with an embodiment of the disclosure. Light bending lens 533 includes a plurality of liquid crystal cells having varying pitch. The pitch of the plurality of liquid crystal cells decreases as liquid crystal cells in the plurality of liquid crystal cells get farther from a center of the light bending lens 533. The illustrated light bending assembly 533 includes a spiral pattern where the pitch of the liquid crystal cells progressively decreases as the spiral moves from the middle of light bending lens 533 to the outside boundary of light bending lens 533.

Figure 5B:
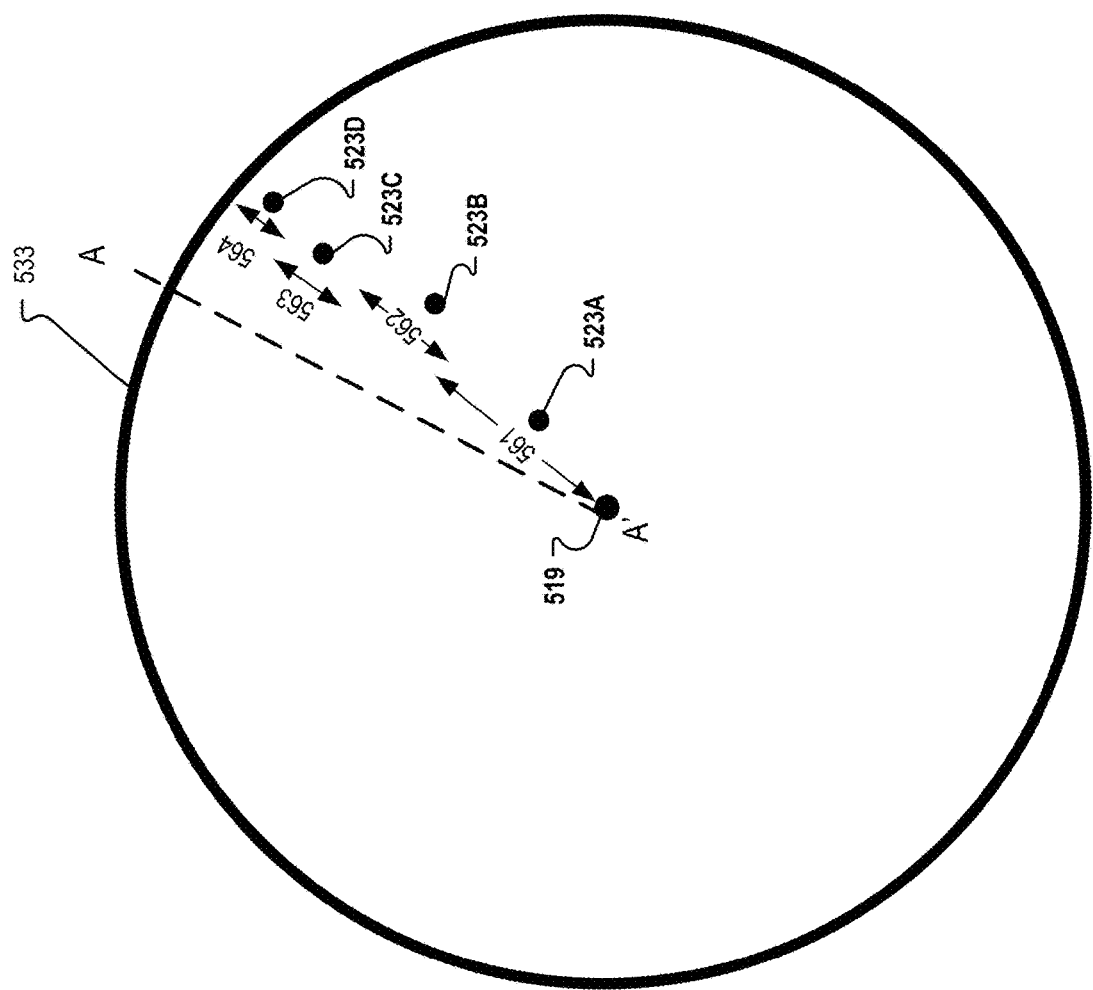

FIG. 5B illustrates dimensions that are representative of the decreasing pitch of light bending lens 533 as a position of the light bending lens 533 moves toward the outside, in accordance with embodiments of the disclosure. Dimension 561 represents an approximate pitch dimension of a liquid crystal cell encountered by a ray of light incident at incidence position 523A, dimension 562 represents an approximate pitch dimension of a liquid crystal cell encountered by a ray of light incident at incidence position 523B, dimension 563 represents an approximate pitch dimension of a liquid crystal cell encountered by a ray of light incident at incidence position 523C, and dimension 564 represents an approximate pitch dimension of a liquid crystal cell encountered by a ray of light incident at incidence position 523D. Therefore, the pitch progressively decreases as the spiral moves out from the middle 519 of light bending lens 533 since pitch dimension 561 is greater than pitch dimension 562, pitch dimension 562 is greater than pitch dimension 563, and pitch dimension 563 is greater than pitch dimension 564.

Figure 5C:
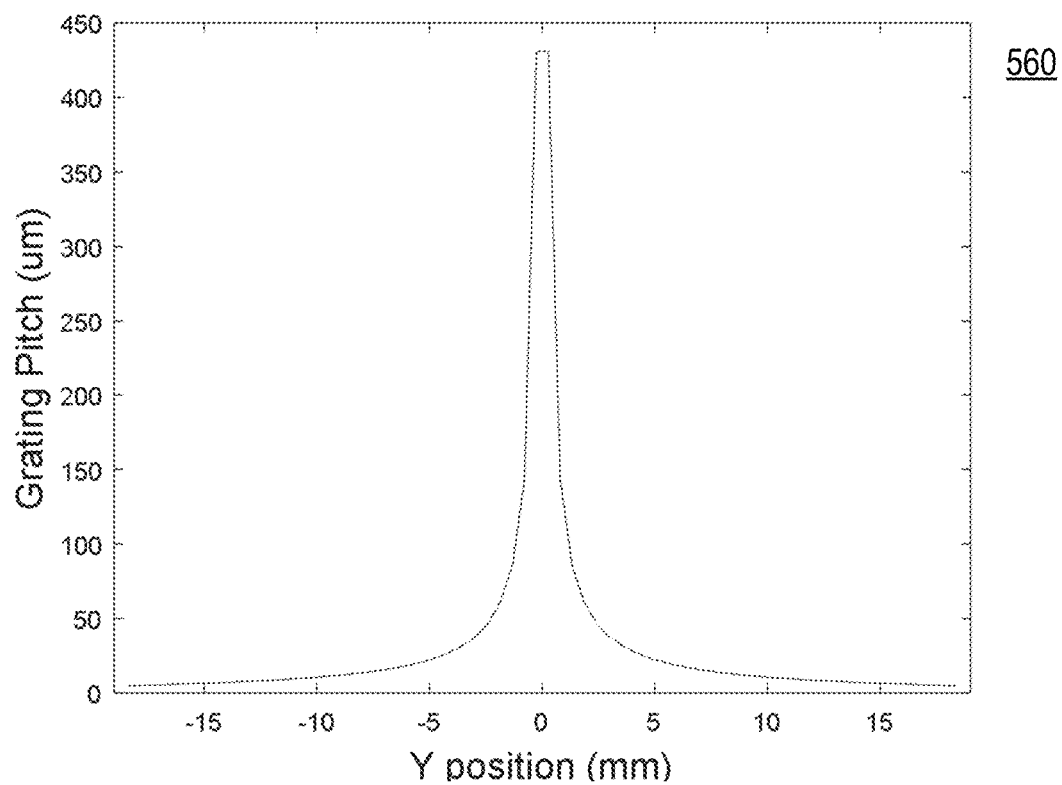

FIG. 5C illustrates an example graph 560 showing an example relationship of the grating pitch as a function of position on example light bending lens 533. The horizontal axis of graph 560 shows the y-position of light bending lens 533 where the origin of the y-position (y value of zero) is at the middle 519 of light bending lens 533. As illustrated by graph 560, the pitch drops from approximately 425 μm in the middle of light bending lens 533 and the pitch is less than 10 μm at the outside boundary of the light bending lens 533.

Figure 5D:
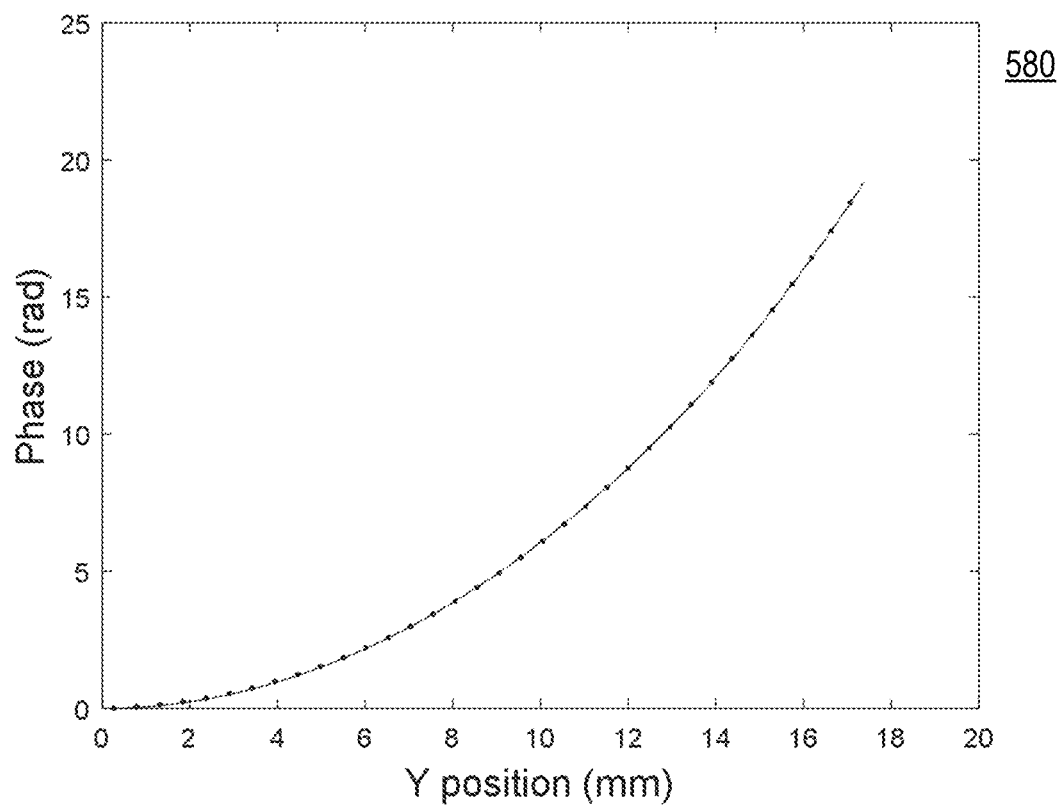

FIG. 5D illustrates an example graph 580 showing an example relationship between the y-position of light bending lens 533 and phase change in radians corresponding to the y-position of light bending lens 533. As the y-position of light bending lens increases, the phase change increases and therefore the bending angle imparted by the light bending lens increases as the y-position gets farther from the middle 519 of light bending lens 533.

Fabricating light bending lens 533 may include spin coating an alignment layer and liquid crystal monomer layer. Then, an ultraviolet (UV) curing step may be utilized to cure the liquid crystal monomer to liquid crystal polymer in a configuration having the optical properties described above. In a different embodiment, two transparent substrates may be coated with a liquid crystal alignment layer. The liquid crystals fill in between the two transparent substrates. If the transparent substrate(s) are coated with transparent conductive layers such as indium tin oxide, the component can be used as an active component that is electronically switched to modulate between bending light and not bending light.

Figure 5E:
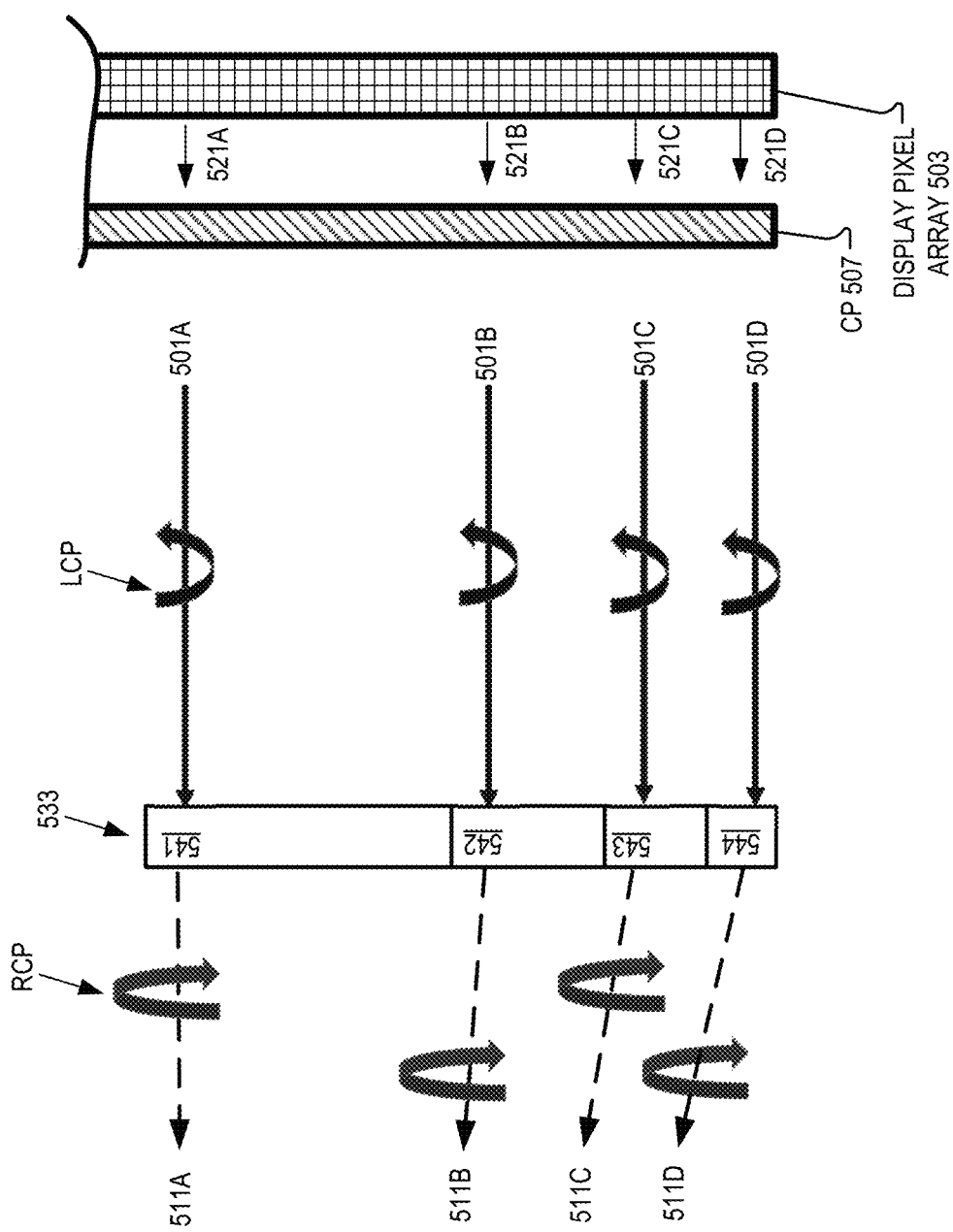

FIG. 5E illustrates an example side view of light bending lens 533 through cutaway line A-A' in FIG. 5B, in accordance with an embodiment of the disclosure. FIG. 5E also illustrates a display pixel array 503 emitting light 521 (including rays 521A-D), which may be polarized or unpolarized. Circular polarizer 507 receives light 521 and generates display light 501, which is circularly polarized. FIG. 5E illustrates that light bending lens 533 may be configured to receive a first circular polarization orientation of the display light and impart a second circular polarization orientation to the compensated display light where a rotation of the first circular polarization orientation of the display light is opposite the second circular polarization orientation. In the illustrated embodiment, display light 501 is oriented as left-hand circularly polarized (LCP) display light 501 and compensated display light 511 is oriented as right-hand circularly (RCP) polarized display light 511. Circular polarizer 507 may include a linear polarizer and a quarter-waveplate to generate the RCP compensated display light 511. Here again, elements 503, 507, and 533 are illustrated as spaced apart in FIG. 5B for illustration purposes, but may be bonded together, in some embodiments.

Referring to FIGS. 5B and 5E together, ray 501A may be incident on light bending lens 533 at incidence position 523A in cell 541 having pitch 561, ray 501B may be incident on light bending lens 533 at incidence position 523B in cell 542 having pitch 562, ray 501C may be incident on light bending lens 533 at incidence position 523C in cell 543 having pitch 563, and ray 501D may be incident on light bending lens 533 at incidence position 523D in cell 544 having pitch 564. FIG. 5E illustrates a bending angle imparted by a given liquid crystal cell increases as the pitch of the given liquid crystal cell decreases. For example, the bending angle imparted by cell 541 may be zero degrees while the bending angle imparted by cell 542 is more than zero degrees because the pitch 562 of cell 542 is less than the pitch 561 of cell 541. The bending angle imparted by cell 543 is greater than the bending angle imparted by cell 542 and the bending angle imparted by cell 544 is greater than the bending angle imparted by cell 543 in FIG. 5E.

Figure 5F:
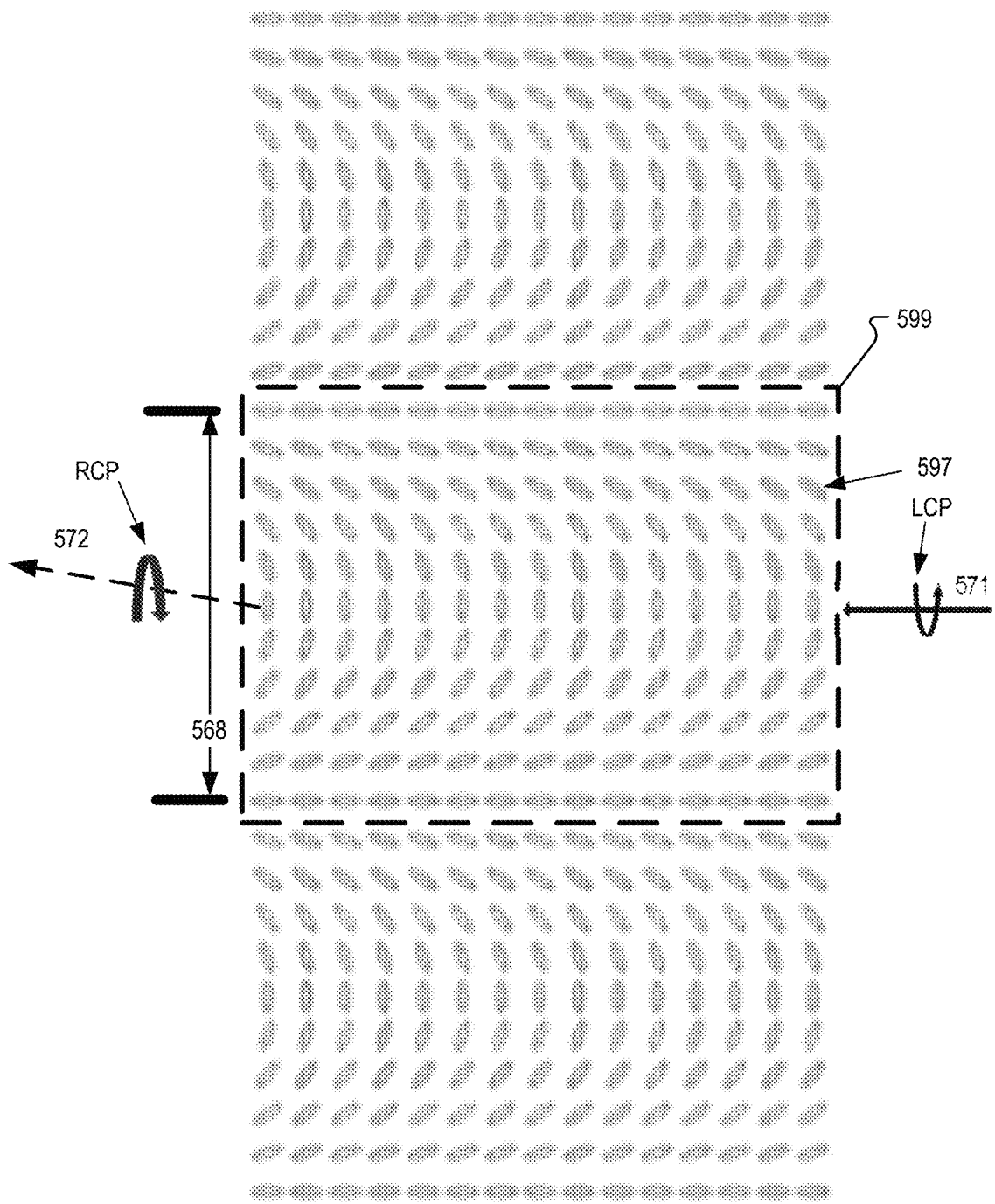

FIG. 5F illustrates a top view of an example illustration of a liquid crystal cell 599 including a plurality of liquid crystal molecules 597, in accordance with embodiments of the disclosure. Liquid crystal cell 599 has a dimension 568 that defines an orientation of the liquid crystals 597 for achieving the designed bending angle of compensated display light ray 572. Dimension 568 is the pitch of liquid crystal cell 599. In the illustrated embodiment, liquid crystal cell 599 receives LHP display light rays 571 and generates RCP compensated display light ray 572 by imparting a bending angle to received display light ray 571.

Figure 7A:
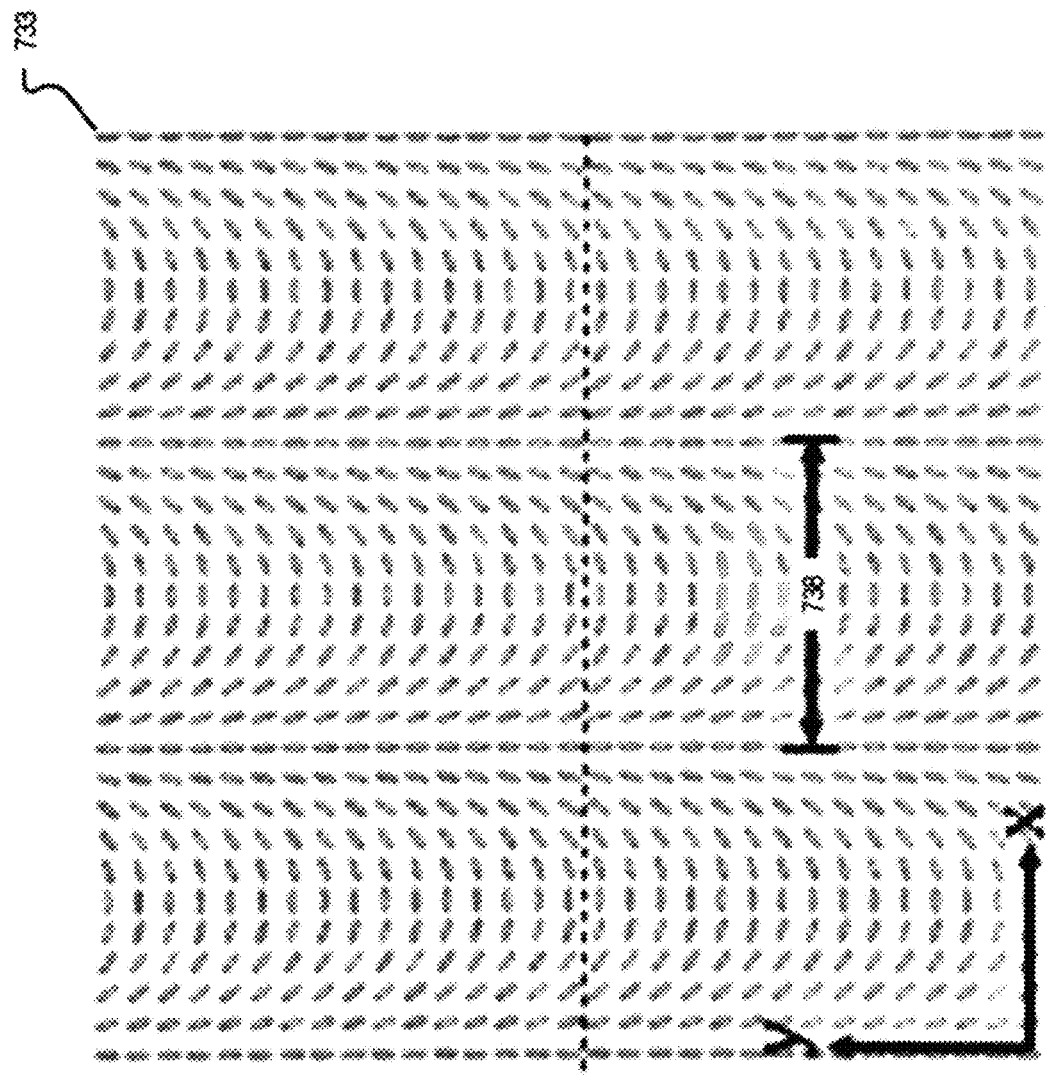
FIGS. 7A-7D illustrate light bending lenses and graphs showing a phase change of circularly polarized light with respect to an incidence position, in accordance with an embodiment of the disclosure.
Figure 7B:
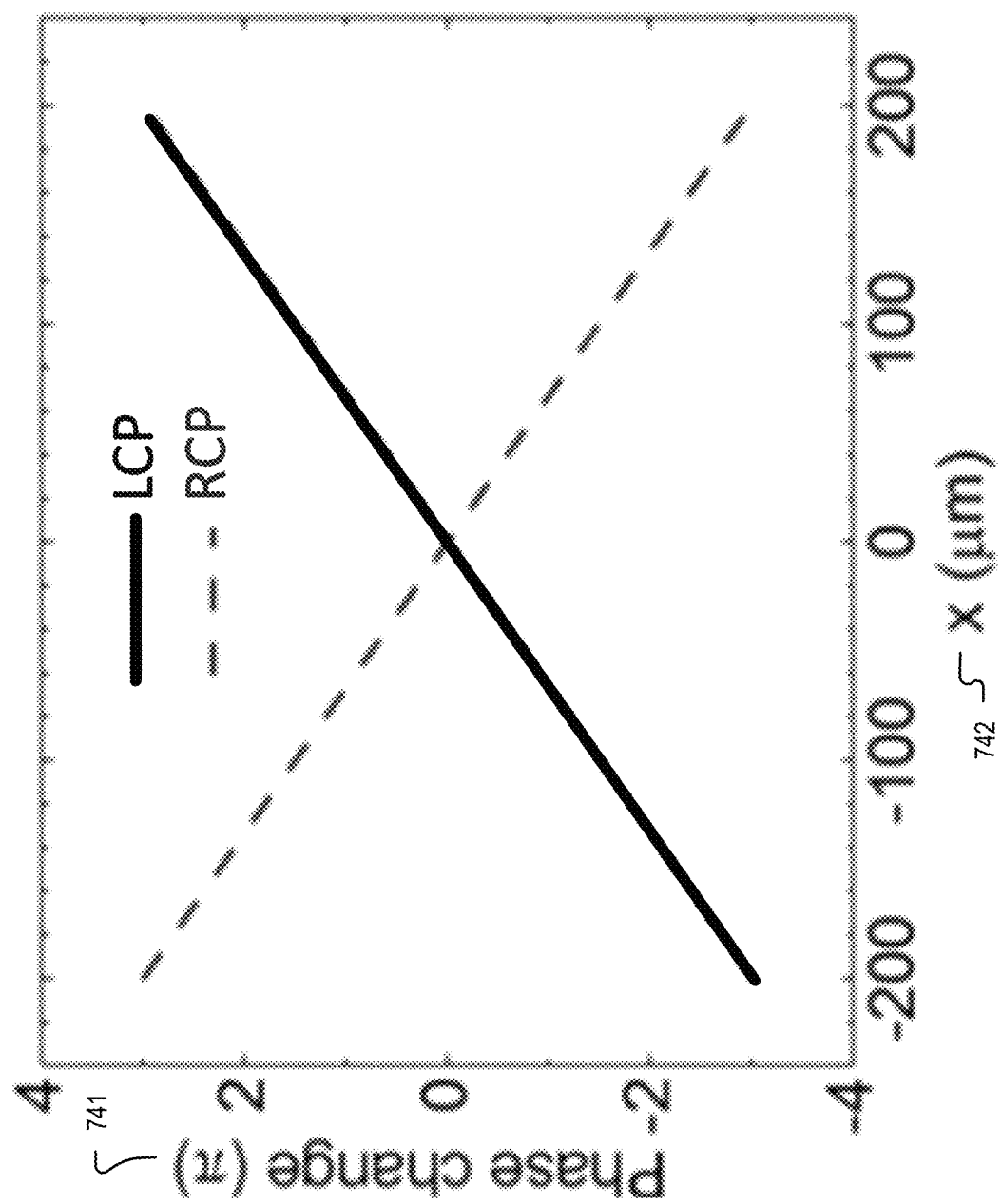

While FIGS. 5A-5F are generally applicable to a light bending lens for bending light to a spherical lens, other configurations of light bending lenses may also be generated. FIG. 7A illustrates an example light bending lens 733 that has a pitch 738 that is constant and therefore incident light may have a bending angle that is constant across light bending lens 733. Light bending lens 733 may be configured with a phase profile for generating compensated display light to direct at a grating, for example. FIG. 7B illustrates a graph 740 showing a phase change of circularly polarized light with respect to a position in the light bending lens 733 that the circularly polarized light propagates through, in accordance with an embodiment of the disclosure. The vertical axis of graph 740 shows a phase change 741 of circularly polarized light corresponding to the x-position in the light bending lens 733 shown in the horizontal axis of graph 740. The phase change of LCP light is illustrated with the solid line while the phase change of RCP light is illustrated with a dashed line. The horizontal axis of graph 740 shows the x-position of light bending lens 733 where the origin of the x-position (x value of zero) is at the middle of light bending lens 733.

Figure 7C:
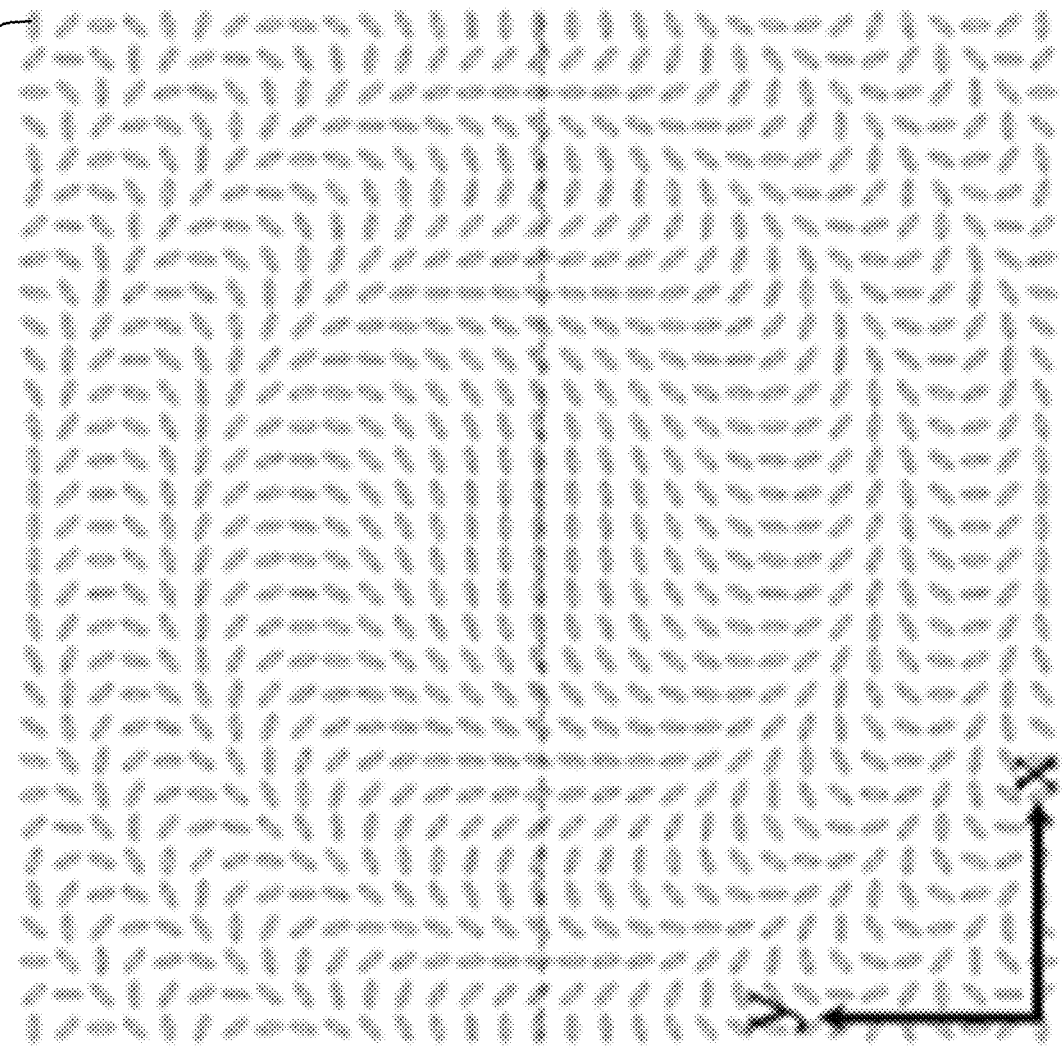
Figure 7D:
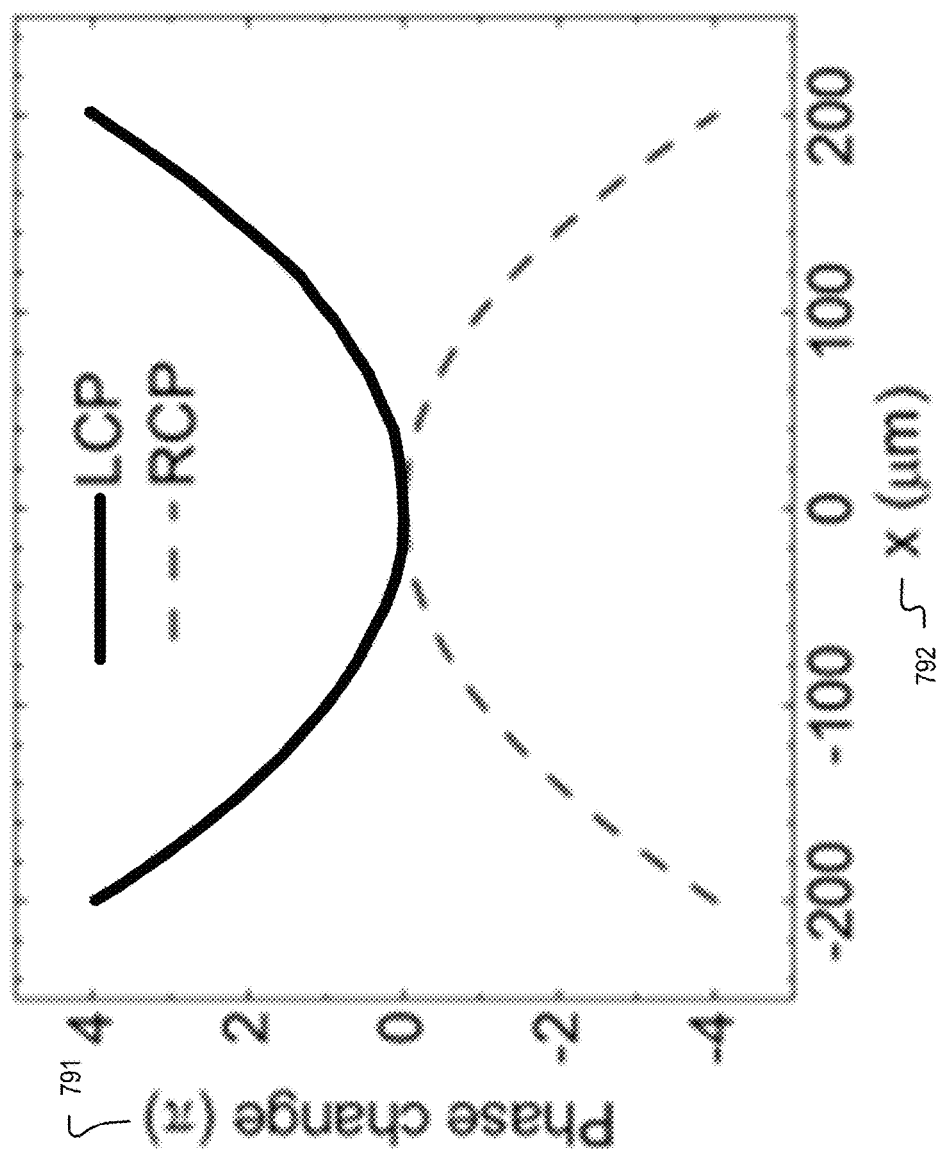

FIG. 7C illustrates an example light bending lens 763 configured for a spherical lens where the liquid crystal pitch varies by position. Therefore, the bending angle of incident light will vary by the incidence position on light bending lens 763. FIG. 7D illustrates a graph 780 showing a phase change of circularly polarized light with respect to a position in the light bending lens 763 that the circularly polarized light propagates through, in accordance with an embodiment of the disclosure. The phase change of LCP light is illustrated with the solid line while the phase change of RCP light is illustrated with a dashed line. The vertical axis of graph 780 shows a phase change 791 of circularly polarized light corresponding to the x-position of light bending lens 763 where in the origin of the x-position (x value of zero) is at the middle of light bending lens 763.

Bending light with example light bending lenses 733 or 763 includes creating a profile of phase versus position. Changing the phase of the light is determined by the axis of LC molecules and the effective birefringence. To accomplish the designed phase versus position profile, the azimuth angle (in plane angle) of liquid crystal molecules may vary by position in a light bending lens. This approach works for circularly polarized light.

Figure 6:
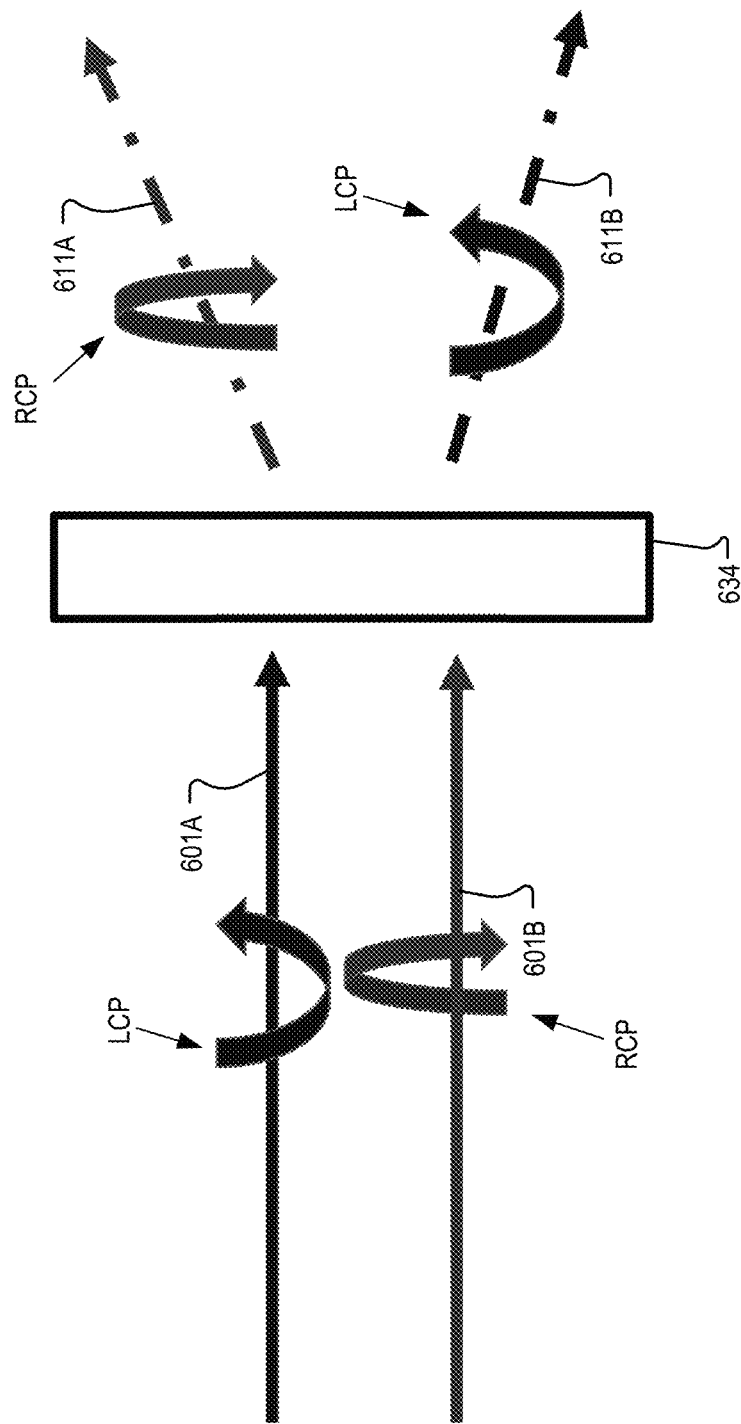
FIG. 6 illustrates a liquid crystal layer changing the polarization orientation of received light, in accordance with an embodiment of the disclosure.

FIG. 6 illustrates a liquid crystal layer 634 changing the orientation of received light 601, in accordance with embodiments of the disclosure. In association with graph 740 and 780, FIG. 6 illustrates that a liquid crystal cell in liquid crystal layer 634 may change the orientation of received LHP display light 601A to RHP display light 611A or change the orientation of received RHP display light 601B to LHP display light 611B, depending on the orientation of the received light. Noticeably, the outgoing compensated display light rays 611A and 611B are bent in opposite directions depending on the orientation of the incoming display light 601.

Figure 8A:
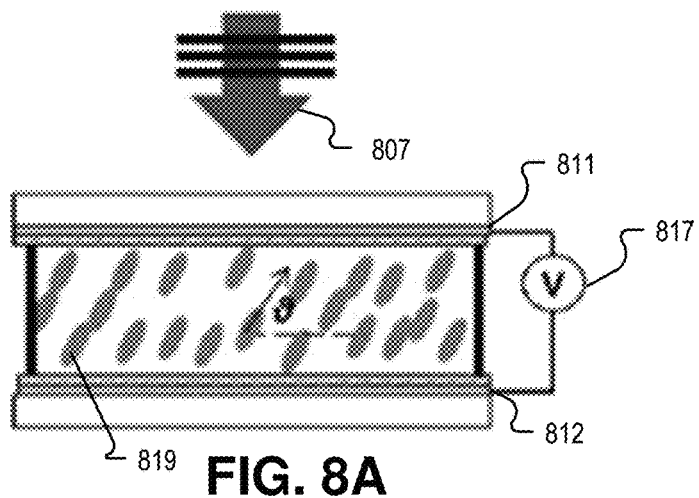
FIGS. 8A-8C illustrate changing a tilt angle of liquid crystal molecules by modulating a voltage across transparent conductive plates, in accordance with an embodiment of the disclosure.
Figure 8B:
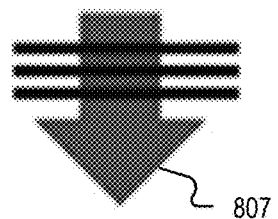
Figure 8C:
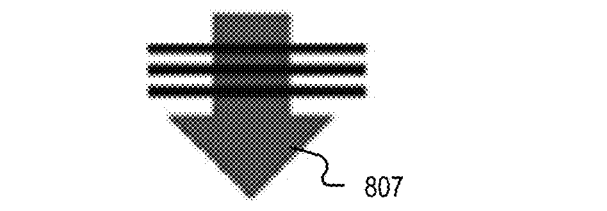

While FIG. 6 illustrates bending circularly polarized light, linear polarized light may also be bent by changing the tilt angle of liquid crystal molecules so that the effective birefringence varies by position. FIGS. 8A-8C illustrate changing a tilt angle of liquid crystal molecules by modulating a voltage across transparent conductive plates. FIG. 8A illustrates liquid crystal molecules 819 disposed between transparent conductive substrates (e.g. ITO) 811 and 812. A driver circuit changes the voltage 817 across the transparent substrates 811 and 812 which changes the tilt angle of liquid crystal molecules 819 and the birefringence encountered by incoming linear polarized light 807. FIG. 8B illustrates that when a first voltage 817 is applied, the tilt angle of liquid crystal molecules 819 changes to generate compensated light 831 whereas FIG. 8C illustrates that when a second voltage 817 is applied, the tilt angle of liquid crystal molecules 819 changes to generate compensated light 832. Thus, different applied voltages 817 generate different bending angles for the compensated light 832.

The embodiments of a light bending lens that includes liquid crystal cells described in connection with FIGS. 5A-8C may be used to realize the characteristics of the light bending assemblies described in FIGS. 3 and 4. By bending the received display light to a chief ray angle of an optical system such as system 300, the image light presented to the eye can be tuned to be substantially uniform across the image rather than becoming progressively dimmer toward the edges, as in conventional designs. The disclosed principles of using liquid crystal pitch to create a profile of phase versus position that is written into a light bending lens may be applied to optical systems beyond system 300. Some optical systems may include aspherical lenses or reflectors to direct display light to the eye. The disclosed principles may be utilized to generate a light bending lens that is matched to an aspherical lens or reflector such that the light bending lens bends the display light at the proper angles to direct the display light to the aspherical lens or reflector. The disclosed principles may be used with displays that include LCD, OLED, and micro-LED pixel arrays. For LCD architectures, the light bending lens may be positioned in front of a liquid crystal pixel array or behind the liquid crystal pixel array to illuminate the liquid crystal pixel array with light that is already bent by the light bending lens at different angles.

In some embodiments of the disclosure, a three-layer light bending lens may be utilized where different layers are engineered to produce a specific birefringence for a specific spectrum and angle. The first layer of the three-layer light bending lens may be engineered for red light, the second layer may be engineered for green light, and the third layer may be engineered for blue light. By engineering each layer for red, green, or blue light, multi-focal point issues associated with different spectrums of light may be improved since the focusing power for each layer may be tuned to the different colors of display light. Each layer may use different liquid crystals molecules having different birefringence.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
a focusing lens configured to focus compensated display light for an eye of a user of the HMD, wherein the focusing lens includes a central optical axis;
a display including a display pixel array configured to generate display light; and
a light bending assembly disposed over the display pixel array to receive the display light and generate the compensated display light for the focusing lens, wherein the light bending assembly bends a given ray of the display light based on an incidence position that the given ray of the display light becomes incident upon the light bending assembly, and wherein the light bending assembly bends the given ray to align with its chief ray angle with respect to the focusing lens.

2. The HMD of claim 1, wherein a bending angle imparted by the light bending assembly increases as the incidence position of the given ray of display light gets farther from a center of the light bending assembly, and wherein compensated rays of the compensated display light propagating at the respective chief ray angle have a substantially same brightness value.

3. The HMD of claim 1, where the central optical axis of the focusing lens is aligned with a center of the display pixel array and a center of the light bending assembly.

4. The HMD of claim 1, wherein the light bending assembly includes a light bending lens configured to receive a first circular polarization orientation of the display light and impart a second circular polarization orientation to the compensated display light, and wherein a rotation of the first circular polarization orientation of the display light is opposite the second circular polarization orientation.

5. The HMD of claim 4, wherein the light bending lens includes a plurality of liquid crystal cells, and wherein a pitch of the plurality of liquid crystal cells decreases as liquid crystal cells in the plurality of liquid crystal cells get farther from a center of the light bending lens.

6. The HMD of claim 5, wherein a bending angle imparted by a given liquid crystal cell increases as the pitch of the given liquid crystal cell decreases.

7. The HMD of claim 5, wherein the light bending assembly imparts a bending angle of approximately 0 degrees to display light received at the center of the light bending assembly, and wherein the light bending assembly imparts a bending angle of between 15 and 25 degrees at an edge of the light bending assembly.

8. The HMD of claim 4 further comprising:
a circular polarizer disposed between the display pixel array and the light bending assembly, wherein the circular polarizer is configured to impart a circular polarization orientation to the display light.

9. A display comprising:
a display pixel array configured to generate display light;
a light bending assembly disposed over the display pixel array to receive the display light and generate compensated display light, wherein the light bending assembly bends a given ray of the display light based on an incidence position that the given ray of the display light becomes incident upon the light bending assembly, and wherein a bending angle imparted by the light bending assembly increases as the incidence position of the given ray of display light gets farther from a center of the light bending assembly; and
a circular polarizer disposed between the display pixel array and the light bending assembly, wherein the circular polarizer is configured to impart a circular polarization orientation to the display light.

10. The display of claim 9, wherein compensated rays of the compensated display light have a substantially same brightness value.

11. The display of claim 9, wherein a center of the display pixel array is aligned with a center of the light bending assembly.

12. The display of claim 9, wherein the light bending assembly includes a light bending lens configured to receive a first circular polarization orientation of the display light and impart a second circular polarization orientation to the compensated display light, and wherein a rotation of the first circular polarization orientation of the display light is opposite the second circular polarization orientation.

13. The display of claim 12, wherein the light bending lens includes a plurality of liquid crystal cells, and wherein a pitch of the plurality of liquid crystal cells decreases as liquid crystal cells in the plurality of liquid crystal cells get farther from a center of the light bending lens.

14. The display of claim 13, wherein a bending angle imparted by a given liquid crystal cell increases as the pitch of the given liquid crystal cell decreases.

15. The display of claim 13, wherein the light bending assembly imparts a bending angle of approximately 0 degrees to display light received at the center of the light bending assembly, and wherein the light bending assembly imparts a bending angle of between 15 and 25 degrees at an edge of the light bending assembly.

16. An optical system comprising:
a lens configured to receive compensated display light;
a display including a display pixel array configured to generate display light; and
a light bending assembly disposed over the display pixel array to receive the display light and generate the compensated display light for the lens, wherein the light bending assembly includes liquid crystal molecules configured to bend the display light at different angles depending on an incidence position of a given ray of the display light upon the light bending assembly,
wherein the light bending assembly is configured to receive a first circular polarization orientation of the display light and impart a second circular polarization orientation to the compensated display light, and wherein a rotation of the first circular polarization orientation of the display light is opposite the second circular polarization orientation.

17. The optical system of claim 16, wherein the liquid crystal molecules are configured to change a phase of the given ray of display light to bend the given ray of display light.

18. The optical system of claim 16, wherein compensated rays of the compensated display light have a substantially same brightness value.

19. The HMD of claim 1, wherein the light bending assembly is disposed between the display and the focusing lens.

* * * * *